United States Patent
Toy

[15] 3,704,062
[45] Nov. 28, 1972

[54] REAR VIEW OPTICAL SYSTEM

[72] Inventor: William W. Toy, Bloomfield Hills, Mich.

[73] Assignee: Lewis G. Harmon, Birmingham, Mich.; a part interest

[22] Filed: March 26, 1971

[21] Appl. No.: 128,498

Related U.S. Application Data

[63] Continuation of Ser. No. 779,922, Nov. 29, 1968, abandoned.

[52] U.S. Cl. .................. 350/301, 350/48, 350/302, 350/307, 88/1.5
[51] Int. Cl. ............................................. G02b 5/08
[58] Field of Search .................. 350/12, 13, 48-55, 350/144, 169-174, 237, 288, 299, 301-307; 88/1.5; 356/106

[56] References Cited

UNITED STATES PATENTS

| | | | |
|---|---|---|---|
| 2,167,657 | 8/1939 | Karnes | 350/301 |
| 2,180,013 | 11/1939 | Mihaly | 88/1.5 |
| 2,482,115 | 9/1949 | Laird | 350/174 |
| 2,757,575 | 8/1956 | Kovach | 350/302 |
| 3,456,999 | 7/1969 | Hopp | 350/301 |
| 3,463,578 | 8/1969 | Smith | 350/302 |

Primary Examiner—David Schonberg
Assistant Examiner—Michael J. Tokar
Attorney—Hauke, Gifford & Patalidis

[57] ABSTRACT

A rear view optical system adaptable to a vehicle having a top wall provided with an opening therein. A first mirror is supported above the opening and is adapted to direct the image downwardly to a one-way or beam splitter mirror which in turn directs the image forwardly to a second mirror. The second mirror in turn redirects the image through the one-way mirror rearwardly to the eyes of the observer in the vehicle.

12 Claims, 8 Drawing Figures

PATENTED NOV 28 1972 3,704,062

INVENTOR
WILLIAM W. TOY
BY
Hauke, Krass, Gifford, & Patalidis

ATTORNEYS

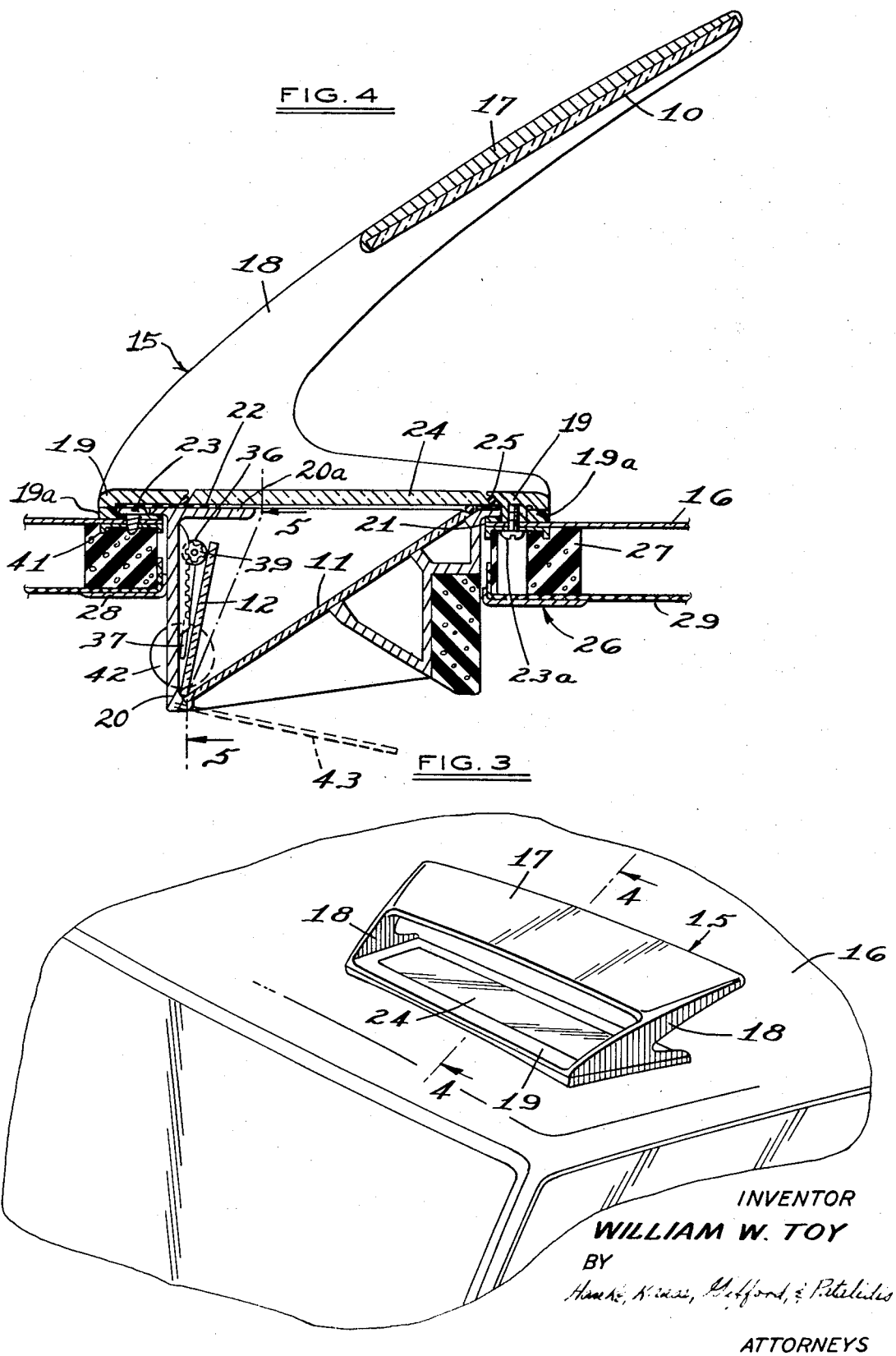

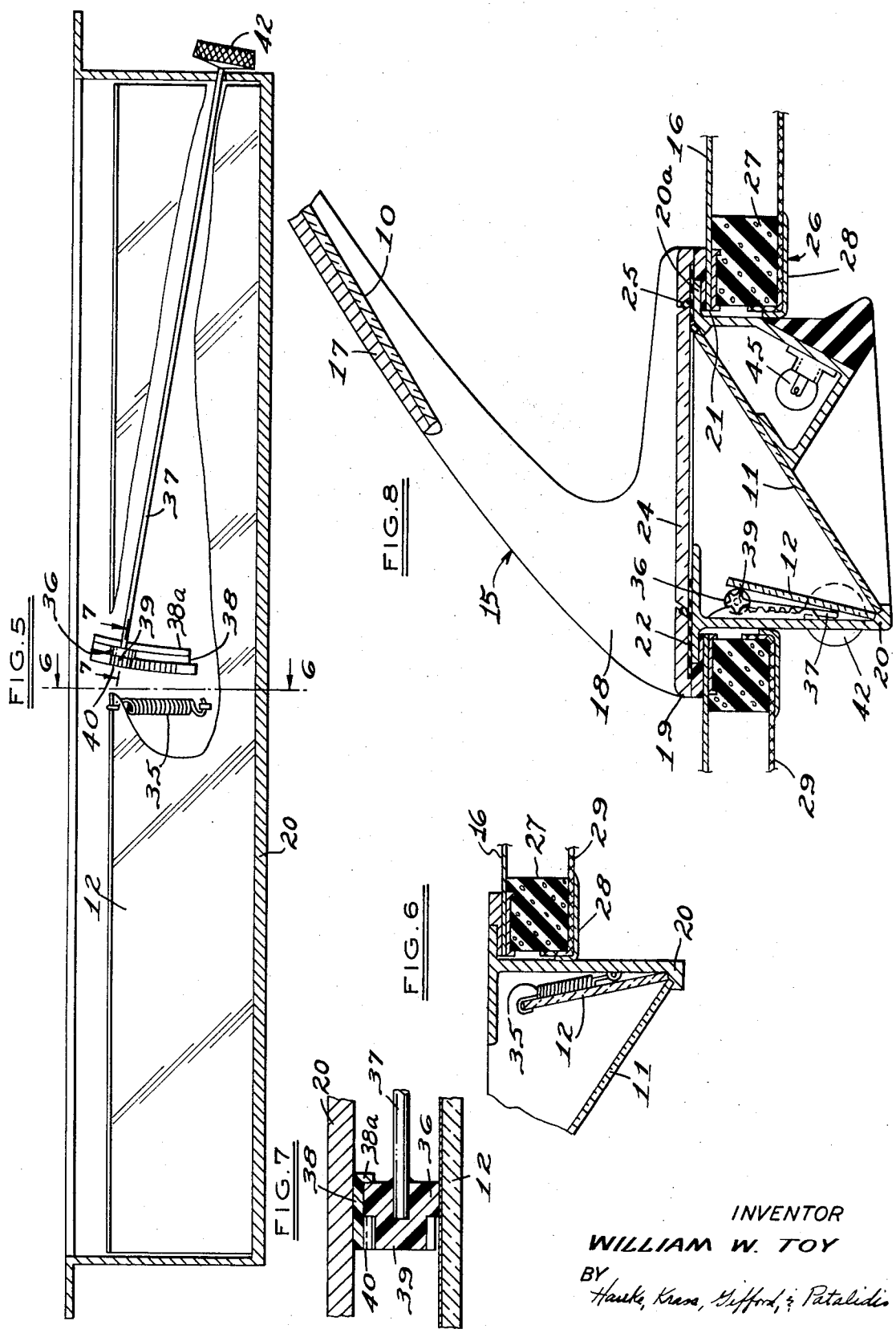

REAR VIEW OPTICAL SYSTEM

This is a continuation of application Ser. No. 779,922 filed Nov. 29, 1968, now abandoned.

This invention relates to a novel optical system, having particular utility when adapted as a rear viewing system for vehicles and the like.

BACKGROUND OF THE INVENTION

It is conventional in automobiles and the like to utilize a single surface rear view mirror. Broadly these mirrors are of two types, center mounted and side view. Each type presents distinct design problems and has inherent disadvantages. The primary design limitation for such a mirror is the requirement that the straight line path from the observer to the mirror and the mirror to the scene being viewed be unobstructed. Partial obstruction in this path produces blind spots or voids in the scene being observed. A second design limitation is the fact that any time a mirror is placed in part of the operator's forward view field, the mirror presents a blind spot in the forward scene proportionate to the mirror's size and the mirror presents a reflected image that quite often blends in with and approximates the forward scene even to the detail of color and movement. The forward blind spot is in effect a camouflaged blind spot and presents a dangerous situation, particularly with respect to pedestrians.

Body designs of vehicles using center mounted mirrors were tall and boxy during the early years of automobile manufacture when the traffic was comparatively light. With the auto occupants sitting in chair type seats, the center rear view mirror, mounted in a position high and forwardly under the roof within the passenger compartment, was a good instrument and it reasonably satisfied the need to observe the rear view. With increasing vehicle speed, it was found desirable to lower the car roof in order to achieve a lower center of gravity and a smaller frontal area. Lowering of the car roof also lowered the vantage point from which the rear view could be seen through the center mounted rear view mirror. Streamlining of the top and styling limitations lowered the top of the rear window, making it necessary to mount the center mounted rear view mirror in a position below the underside of the roof. With such a lower mounting, the inherent limitations of the single surface center mounted rear view mirror result in many deficiencies that are dangerous for the operation of a vehicle in modern high density traffic. The mirror no longer affords a high vantage point from which to view the scene. Quite often the mirror has become a camouflaged blind spot in the operator's forward vision. Also, occupants within the vehicle obstruct the rear view with the mirror mounted in a low position. One manufacturer recognized the danger of the camouflaged forward blind spot, and mounted the mirror on the top of the dashboard below the operator's forward vision. This attempted solution to the overall problem only emphasized the rear view restriction presented by the vehicle occupants. The uninterrupted width of the rear view afforded by this type mirror is also limited by the width of the rear window.

Attempts to improve the plane single surface rear view mirror have been made by adding power to the mirror. When this is done, the image is distorted and the driver receives a false indication of depth. Approaching vehicles having a constant velocity relative to the viewer appear to have a positive or negative acceleration. When wide angle distortion is used, cars appear to zoom suddenly from a far back indiscriminate position.

Single surface side view mirrors have become more popular with the increase in traffic and the poor vision afforded by the center mounted mirror. Some states by law now require such a side view mirror. The rear view coverage provided by the side view mirror is restricted to the one side of the vehicle, making it necessary to have both a right and left hand mirror to cover both sides of the vehicle. In use this arrangement requires the operator to turn his head from side to side and makes it impossible to view both side rear views at the same time. The view afforded in practice is essentially monocular and therefore without the advantage of depth perception. At night such a mirror is blinding as it reflects the lights from vehicles approaching from the rear into the eyes of the operator. Drivers using side view mirrors that are adjustable from within the car usually turn the mirror out of position at night and are without the side rear view during night operation of the car.

Other disadvantages of side view mirrors are that they may be obstructed by vent window structures, and being relatively low to the ground they are rapidly dirtied in wet weather by spray from the front wheels of the vehicle and other vehicles.

The center mounted day-night type mirror now in common use reflects a primary (bright) and a secondary (dim) image at different angles. As only one image is used at a time, this type mirror for purposes of this discussion conforms to the single surface rear view mirror designation. Successful use of this principle requires masking of the primary image. This is done in the center mounted installation by the lower intensity of the light reflecting from the roof underside or some other view within the vehicle. Side view mirrors are not adaptable to the day-night type mirror principle. This, coupled with the low position of the side view mirror on the vehicle where they are in the direct beam of the lights of the cars to the rear, makes the use of side view mirrors very ineffective and at times dangerous at night.

Overhead periscopic mirrors have been proposed to eliminate the above difficulties, but these introduce many problems. For example, an ordinary two-mirror system inverts the image, which can't be tolerated, but a third image correcting mirror introduces large scale reduction in the field of view since the mirrors must be so located to prevent the intermediate mirror from obstructing the line of sight, and hence the sight path becomes excessively long, thus producing "tunnel" vision. The use of inverting prisms are objectionable primarily because of their very high cost.

Among the objects of the present invention are to provide an optical system adaptable to vehicles and the like which provides:

1. A mirror-like reversed image view to the rear of the vehicle that motorists are familiar with and accustomed to interpreting;

2. A rear view from a relatively high vantage point enabling the driver to observe vehicles approaching from the rear over slight recesses or depressions in the roadway;

3. A wide-angle unobstructed rear view;

4. A rear view wherein depth perception is retained with the use of binocular vision;

5. A rear view that permits the driver to observe the rear on both sides for approaching vehicles at the same time without turning his head from side to side;

6. A rear view that cannot be obstructed by the car occupants;

7. An unobstructed rear view that is not limited in width by the width and for and aft position of the rear window;

8. A closed chamber for thermal insulation between the beam splitter element of the invention and the roof opening glass, thereby preventing fogging on either surface from the car interior;

9. For the accommodation of styling and engineering changes to make the vehicle more desirable and stable, by lowering the center of gravity and the like;

10. A view point effectively out of the direct beam of car lights to the rear; thereby inherently reducing the glare from the lights of a following vehicle;

11. For automatic masking of rear approaching vehicle lights when a following vehicle is in a tail-gating or in a close proximity parked position;

12. Image reflection not subject to any undesirable aberrations;

13. Rear viewing which provides for adequate peripheral vision without distortion;

14. Periscopic viewing does not have transverse parallax;

15. Ready adjustability;

16. Relatively low cost compared with prism and other complex systems;

17. Means for signaling to the rear from an apparent point above the car without the use of lights mounted on the exterior of the vehicle; and 18. Periscopic rear viewing with a shortened line of sight.

SUMMARY

Basically the essence of the optical system embodying the present invention comprises a one-way or beam splitter mirror which receives an image and in turn directs the image forwardly to a second mirror. The second mirror in turn redirects the image rearwardly through the one-way mirror to the eyes of the observer.

When used in a vehicle, another mirror is mounted on the roof or within a raised housing in the roof and above an opening therein to direct the image downwardly to the beam splitter mirror mounted in a housing provided within the opening. The second mirror reflects the image from the beam splitter to the eyes of the driver and is preferably adjustable relative to his or her eye level.

DESCRIPTION OF THE DRAWINGS

FIG. 3 is a fragmentary perspective view of the system of an automotive vehicle.

FIG. 4 is a fragmentary sectional view on an enlarged scale taken along the line 4—4 in FIG. 3.

FIG. 5 is a fragmentary sectional view taken along the line 5—5 in FIG. 4.

FIG. 6 is a fragmentary sectional view taken along the line 6—6 in FIG. 5.

FIG. 7 is a fragmentary sectional view on an enlarged scale taken along the line 7—7 in FIG. 5.

FIG. 8 is a fragmentary sectional view on an enlarged scale similar to FIG. 4 but showing a modified form of the invention.

DESCRIPTION

Figure 1:
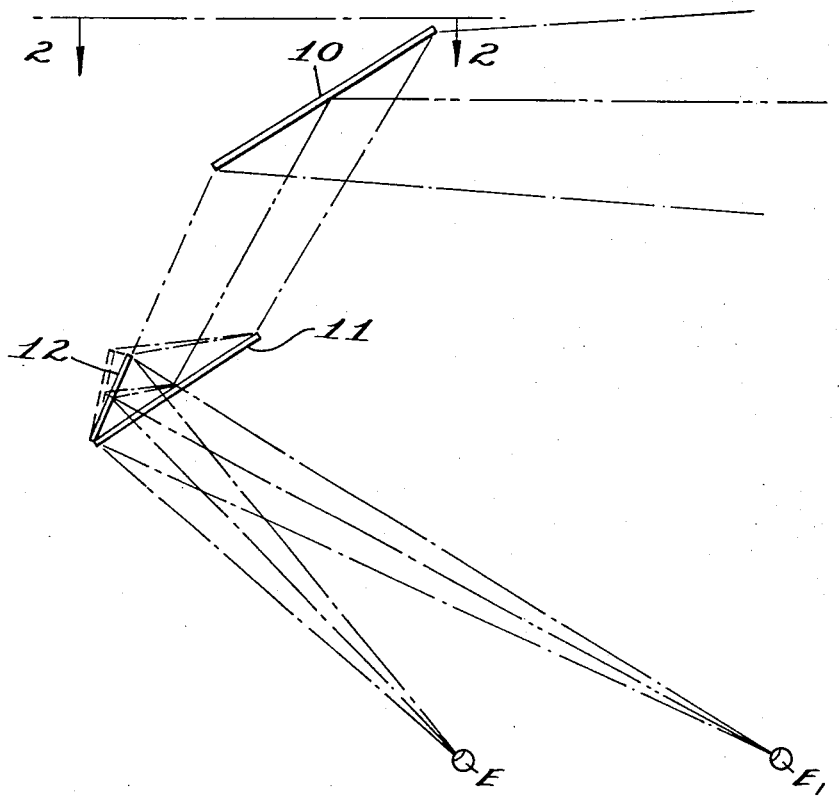
FIG. 1 is a partly diagrammatic side elevational view of an optical system embodying the invention.

Referring to FIG. 1, the optical system embodying the invention comprises a first elevated mirror 10 reflecting a rear view with respect to the eye E of the observer, a one-way or beam splitter mirror 11 positioned below the mirror 10 and extending generally upwardly and rearwardly, and a second rear view mirror 12 extending upwardly and rearwardly and positioned forwardly of and in close proximity to the beam splitter mirror 11.

As represented by the lines-of-sight diagrams, the rearward image is reflected downwardly and forwardly by the mirror 10 against the beam splitter mirror 11. The beam splitter mirror 11 in turn reflects the image forwardly against the mirror 12 which in turn reflects the image rearwardly through the beam splitter mirror to the eye E of the observer.

In the event that the observer is located so that his eye is at the position $E_1$, the mirror 12 can be adjusted in its angle to reflect the image to his eye. If desirable the mirror 10 can be made adjustable to correct for installation variations. This would be a one time adjustment.

Figure 2:
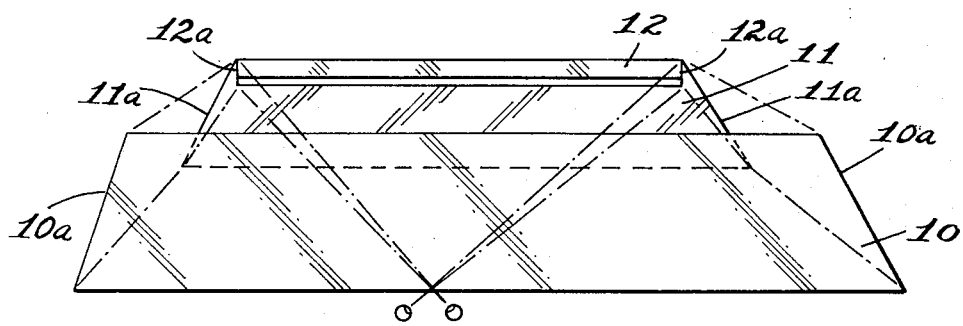
FIG. 2 is a plan view of the system shown in FIG. 1.

As shown in FIG. 2, each of the mirrors 10, 11 and 12 has parallel horizontal edges. The side edges 10a of the mirror 10 extend upwardly and outwardly as do the side edges 11a of the beam splitter mirror 11. The side edges 12a of the mirror 12 are generally vertical.

By this arrangement, the wide angle of the image viewed is obtained with a minimum size of the various mirrors.

Referring to FIG. 3, the optical system when adapted to a vehicle is made in the form of an assembly 15 that is mounted on the roof or top 16 of the vehicle substantially in alignment with the driver but preferably slightly to his right. By this arrangement the normal forward vision of the driver is utilized resulting in minimum distraction, yet with binocular reinforcement of the image being viewed. The system further has an advantage in that it enables persons with blind areas, such as persons having cataract spectacles, to utilize the system. If desired, the assembly may extend entirely across the vehicle top to provide rear viewing capability for the passenger also. The assembly 15 might also be constructed as an integral part of the car top 16 as an elevated housing therein. Inumerable styling possibilities will be apparent.

As shown in FIGS. 3 and 4, the mirror 10 is mounted in a shroud 17 the upper surface of which protects the mirror. The shroud 17 has stanchions 18 along the sides thereof which are formed integrally with a peripheral frame 19. The mirrors 11 and 12 are mounted in a housing 20 that has a peripheral flange 20a and is adapted to be inserted in an opening 21 formed in the car top 16. The frame 19 is adapted to rest upon a resilient gasket 22 interposed between the frame 19 and the flange 20a. Screws 23 pass through the spacer 19a and the car top 16 and are threaded into a flange 41 provided around the opening 21 under the top 16.

Screws 23a are threaded upwardly through the flange 41 into bosses on the underside of the frame 19.

A transparent glass or plastic plate 24 rests on the gasket 22 and is held in position by the flange 20a. A resilient gasket 25 is interposed between the edge of the plate 24 and the frame 19 to provide a water-tight seal between the plate 24 and the gasket 22. With this design the top of the frame 19 is kept at or below the top surface of the plate 24 in order to provide for water run off. A spacer 19a may be interposed between frame 19 and the car top.

If desired, the shroud 17 may be a complete housing enclosure with a rear window glass area, to fully protect both the mirror 10 and plate 24 from dirt and water, or it may be closed only on the front side. If the shroud 17 is completely closed and substantially hermetically sealed, the plate 24 may even be omitted entirely. Alternatively, the front side may be provided with louvers so that air will pass through but rain and condensation will be substantially excluded from the plate 24, such construction preventing accumulation of dirt and the like within the shroud.

A trim assembly 26 can be provided around the housing 20 as required. The trim assembly 26 preferably comprises a block 27 of resilient material which is generally rectangular and surrounds the opening 21 in the car top 16. A snap-on frame 28 surrounds the housing 20 and holds the roof trim 29 such as cloth or plastic in position around the housing 20.

As shown in FIGS. 4, 5 and 6, the mirror 12 is yieldingly urged toward the forward side of the housing by a tension spring 35 that is hooked at on end over the mirror and is fixed to the housing at the other end. A roller 36 mounted on a shaft 37 is interposed between a guide 38 and the mirror 12. The roller 36 includes a gear 39 of smaller diameter than the roller and meshed with a curved rack 40 on the guide 38. A flange 38a on the guide 38 cooperates with the rack 40 to prevent transverse movement of the roller 36. The shaft 37 extends outwardly to the side of the housing 20 and a knob 42 is provided thereon. By rotating the knob 42, the gear 39 is translated along the rack 40 causing the roller 36 to roll and move the mirror 12 outwardly and inwardly thereby changing its angular position.

If desired, the entire rear view mirror system may extend across the width of the roof top for use by other vehicle passengers. In such a case, the mirror 12 may be made with separate right and left hand sections, each with its own adjusting means. Note that if the mirror 12 is tilted down flush or almost flush against the beam splitter mirror 11, it may be used as a direct image reflecting mirror such as the old passenger side mirrors which have mostly gone out of use today.

Installation of the assembly in the vehicle is accompanied with the use of patterns. The flange 41 can be used as a templet and guide when cutting the roof.

The portions of the housing 20 which are in the direct line of sight of the mirror 12 preferably have a light-absorbing finish, such as a dull black finish, in order to prevent a ghost image of a portion of the housing 20 viewed by the mirror 12 from being directed to the eyes of the observer.

In order to prevent another ghost image which would occur due to reflection from the observer's side by the coating on the beam splitter mirror 11 back to the eyes of the observer, it is preferred to decrease the density of the coating on the beam split mirror, as contrasted to conventional commercially available beam splitter mirrors. Alternatively a mask 43, shown in broken lines in FIG. 4 can be utilized to prevent images from being directed upwardly to the beam splitter mirror 11.

The second ghost image from the observer's side of the beam splitter mirror 11 may also be minimized by tinting, that is, reducing the transmission of the glass of which the beam splitter 11 is made.

It has also been found that for best results, the overall efficiency of the system should be preferably on the order of about at least 15 percent. This takes into consideration the sensitivity of the human eye which is able to adapt to varying intensities of light. The image transmission efficiency of the overall system can be increased by decreasing the density of the coating on the beam splitted mirror to an optimum point.

Decreasing the coating on the beam splitter mirror will also minimize the second ghost image from the observer's side of the beam splitter mirror.

The use of the optical system with two mirrors and a beam splitter mirror permits the overall dimensions of the system to be substantially reduced as compared with heretofor proposed triple mirror rear viewing principles, since the beam splitter mirror 11 is installed in close proximity to the second mirror 12 but does not obstruct the line of sight. Thus the system is compact in volume so that it can be readily applied in the roof of a vehicle without interfering with the normal direct vision of the driver.

A further feature of the invention as described above is that the chamber between the plate 24 and the beam splitter mirror 11 and its surrounding structure can be substantially hermetically sealed to prevent formation of condensate on the interior surfaces and parts. The insulation provided by the sealed chamber also prevents condensation from forming on the underside of the beam splitter mirror 11 after thermal equilibrium conditions have been established. This feature is important in permitting usage of the system under conditions of high humidity and inclement weather.

It will be noted in FIG. 4 that approximately one-half the width of the beam splitter mirror 11 is supported by mounting structure.

In the form of the invention shown in FIG. 8, lights 45 are installed in the structure under the half of the beam splitter not used for through transmission of the image, in such a fashion that the lights will be visible from the rear of the vehicle. These lights can be used for signaling stop, turns and the like and would appear to a following motorist to be eminating from the mirror 10 above the roof. This is quite desirable for the proper observation of signals in heavy traffic and when an over-taking vehicle is approaching over a slight mound. The first ghost image could be employed in combination with small light colored spots in the light compartment for a confirmation signal to the driver that the signaling device is working, or small perforations could be provided in the structure directly beneath the lights for direct observation thereof.

The glass plate 24 installed in the vehicle top opening may be provided with a defrosting heater element such as is used on the rear windows of some vehicles. Since the opening is much smaller than a normal rear window, such a device would be much cheaper and require much less power to operate.

Vehicle designs may be radically changed using this overhead optical system, and rear windows could even be eliminated entirely.

This overhead system also has the advantage of being higher than the beam of an overtaking vehicle's headlights, even when on high beam, thus tending to eliminate glare in the observer's eyes. It will also be noted that the elements which produce the new optical system are the beam splitter and its adjacent mirror, the image being received on a transverse line relative to the observer's line of sight, whether the upper rear viewing mirror is involved or not, so that the important components could be used for transverse as well as rear viewing.

Although I have shown and described only a few embodiments of my novel optical system and its utility in a vehicle environment, it will be apparent to one skilled in the art that various changes and modifications may be made therein and various other uses thereof may be made without departing from the spirit of the invention as expressed in the appended claims.

I claim:

1. A periscopic rear view mirror system for a vehicle having an opening in the roof disposed forwardly of the vehicle driver, comprising
   a. a first planar mirror located above the vehicle roof line and sloping rearwardly to reflect an image from the rear of the vehicle downwardly through the roof opening,
   b. a second planar semi-transparent mirror located below said first mirror and sloped forwardly to reflect the image from the first mirror forwardly with respect to the vehicle driver
   c. a third planar mirror located forwardly of said second mirror and positioned to reflect the image therefrom rearwardly and downwardly through said second mirror toward the vehicle driver's eye.

2. The system as in claim 1 wherein the lower edges of said second and third mirrors are closely adjacent to minimize the distance of image reflection therebetween.

3. The system as in claim 1 wherein said second and third mirrors are carried in a closed housing mounted in said roof opening and having an upper transparent window through which the image is transmitted from the first to the second mirror.

4. The system as in claim 2 wherein said housing has a lower wall a part of which consists of a lower horizontal portion of said second mirror through which the image is viewed by the vehicle driver.

5. The system as in claim 4 wherein an upper horizontal portion of said second mirror is disposed within said housing, and including a light located in said housing rearwardly and below the upper portion of said second mirror for directing light therethrough toward said first mirror for rearward reflection therefrom.

6. The system as in claim 1 wherein said first mirror is located at least partially rearwardly of said second mirror to reflect the image from the first mirror to the second mirror in a direction generally forwardly with respect to the vehicle driver.

7. The system as in claim 1 wherein the third mirror is vertically dimensioned to be viewed by the vehicle driver only through a lower portion of said second mirror.

8. The system as in claim 1 wherein said third mirror is pivotal about the horizontal line of its lower edge to vary the angle at which the image is reflected to the driver's eye through said second mirror.

9. The system as in claim 1 wherein said first mirror is carried between side support arms upstanding from said vehicle roof and is spaced therefrom to provide an opening between the lower edge of said first mirror and said roof.

10. The system as in claim 1 and including a shield located below said second mirror to prevent images of the vehicle interior from being reflected to the driver's eye from the lower side of said second mirror.

11. The system as in claim 1 and including a light located rearwardly of and below said second mirror for directing light therethrough toward said first mirror for rearward reflection therefrom.

12. The system as in claim 1 wherein portions of said second and third mirrors extend upwardly into said roof between the upper and lower surfaces thereof.

* * * * *

UNITED STATES PATENT OFFICE
CERTIFICATE OF CORRECTION

Patent No. 3,704,062    Dated November 28, 1972

Inventor(s) WILLIAM W. TOY

It is certified that error appears in the above-identified patent and that said Letters Patent are hereby corrected as shown below:

IN THE SPECIFICATION

Column 3, line 61, change "of" to --on-- ;

Column 5, line 33, before "end" change "on" to --one-- ;

line 56, change "accompanied" to

--accomplished-- .

Signed and sealed this 24th day of April 1973.

(SEAL)
Attest:

EDWARD M. FLETCHER, JR.        ROBERT GOTTSCHALK
Attesting Officer              Commissioner of Patents